Sept. 28, 1943.                B. BARÉNYI                    2,330,541
            SHOCK ABSORPTION MECHANISM FOR AXLES OF MOTOR CARS
                            Filed Dec. 3, 1940
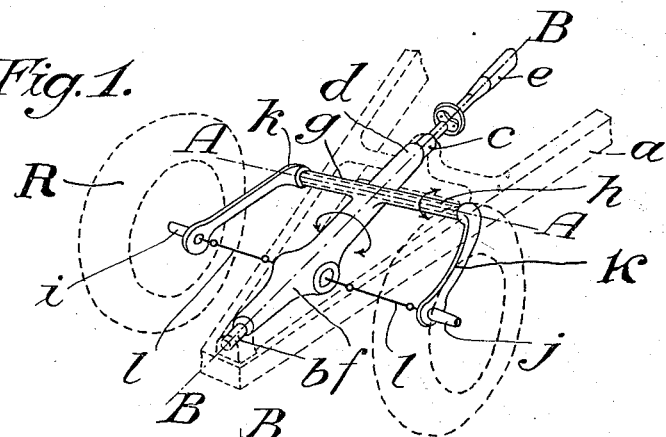
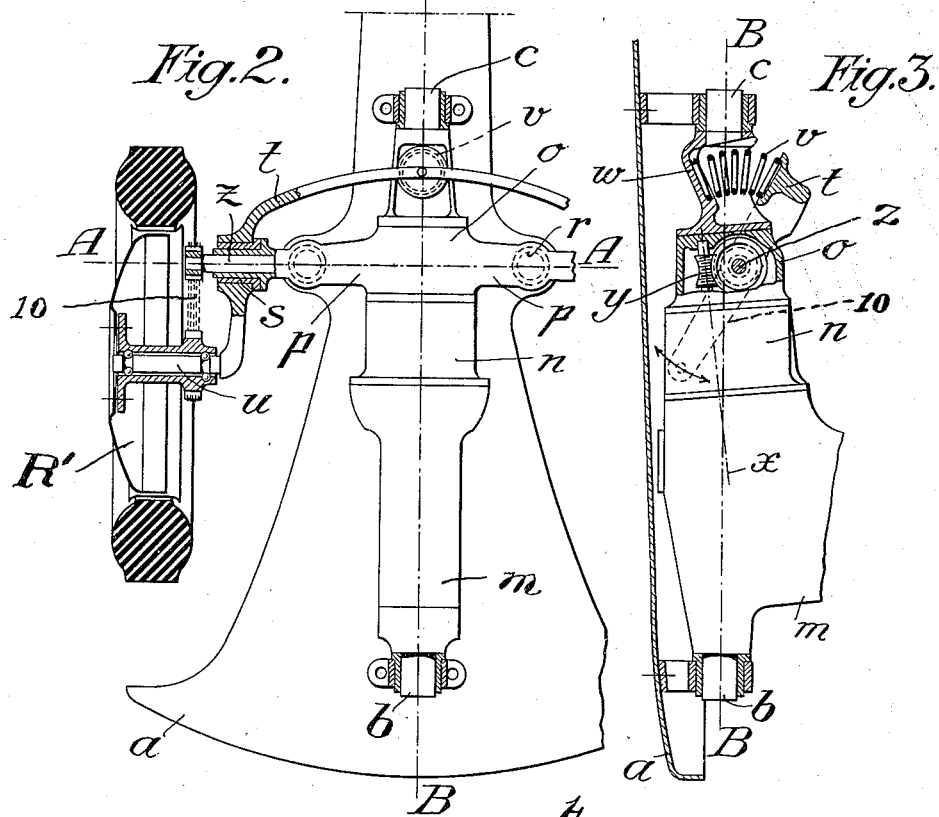
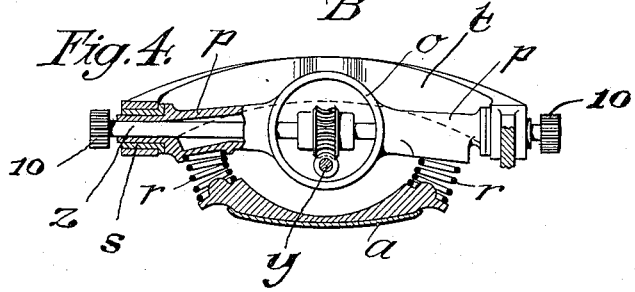
INVENTOR
Bela Barenyi
BY
ATTORNEYS Patented Sept. 28, 1943

2,330,541

UNITED STATES PATENT OFFICE 2,330,541

SHOCK ABSORPTION MECHANISM FOR AXLES OF MOTOR CARS

Béla Barényi, Boblingen, Germany; vested in the Alien Property Custodian

Application December 3, 1940, Serial No. 368,291
In Germany December 6, 1939

16 Claims. (Cl. 180—73)

The invention relates to shock absorption mechanism for axles of motor cars, and its object is a satisfactory kinematic guiding of the axle or the wheels respectively, with reference to the vehicle top or framework (which means either special vehicle frames or for instance self contained vehicle bodies and the like).

An essential feature of the invention consists in the arrangement whereby the axle or the axle members are journaled not directly upon the vehicle top but upon an intermediate supporting piece in such a way that with respect to the supporting piece they may swing around a transverse axis of the vehicle, while the supporting piece proper may swing together with the vehicle top around a longitudinal axis of the vehicle.

By this division of the swinging motions of the axle or of the axle members with respect to the vehicle top, it is possible for example to avoid a special guidance of the axle in vertical direction, in order to support it against transverse motion, even when springs are used which are yielding in transverse direction. The axle may for instance be cranked bow-like from the vertical transverse plane of the wheel centers forward or backward, the crank parts serving for journalling the axle at the supporting piece.

The supporting piece of the axle swinging around the longitudinal axis may comprise the entire driving block inclusive of the motor or only part of the driving block, for instance the differential gear. If the drive of the wheels is led from the supporting piece through the bearing pins of the wheel-axle at this supporting piece, a further advantage results, that shafts or clutches which are longitudinally displaceable are not necesary, in order to let the wheel drive follow the spring motions of it.

Furthermore the invention relates to suitable construction forms of the axle, of its journalling and of the arrangement of the springs.

In the drawing two types of the invention are illustrated by way of example:

Fig. 1 shows the construction of a rear axle suspension in perspective view.

Fig. 2 shows another construction in plan view (partially in section) also as an example for a rear axle aggregate.

Fig. 3 is a side view, partially in section, through line B—B of Fig. 2.

Fig. 4 is a front view of the aggregate, partially in section through line A—A of Fig. 2.

With the embodiment shown in Fig. 1 the bearings $b$ and $c$ for the supporting piece $d$ are spaced longitudinally of the frame $a$, the turning axis of the supporting piece $d$ extending in the central longitudinal plane of the vehicle, as does the Cardan shaft $e$ for the vehicle drive. The supporting piece $d$ consists substantially of a casing comprising adjacent one extremity the differential gear $f$, and adjacent the other extremity a transverse tube $g$ for journalling a pin-formed transverse part $h$ of the rigid wheel axle. The wheel axle, carrying at its pins $i$ and $j$ the rear wheels R, consists of the said pin-like cross-part $h$ and the two crank-shaped side parts $k$. The drive of the wheels ensues from the motor through the Cardan shaft $e$, the differential gear $f$ and the two lateral transverse joint-shafts $l$. The shock absorption may be accomplished in any desired way, for instance by suitably positioned springs.

The operation is clearly evident:

With shocks in the same direction, by which the two wheels are lifted uniformly, only the axle $k$—$h$—$k$ is oscillated around the transverse axis A—A of the pin-part $h$. With unsymmetric lifting motions of the wheels, simultaneously a torsional motion of the entire axle aggregate ensues, i. e. of the axle $k$—$h$—$k$ proper as of the supporting piece $d$ around the central longitudinal axis B—B of the vehicle. As the Cardan shaft $e$ lies in this longitudinal axis, the axle drive will not be influenced by this torsional motion.

With the embodiment shown in Figs. 2 to 4 the supporting piece is formed substantially by the motor $m$, including the flywheel and clutch, the gear $n$ and the differential gear $o$. The entire casing block is again journaled swingably upon the bearings $b$, $c$, mounted in the central longitudinal axis B—B on the frame $a$ of the vehicle. The differential gear casing $o$ has lateral tubular extensions $p$, and between these extensions and the frame unguided helical springs $r$ are arranged, supported from below approximately in the swinging arc of the casing block. Upon the pin-shaped ends of the extensions $p$ the substantially U-shaped rigid axle $t$ is journaled in bearings $s$ and may swing with respect to the supporting piece around the axis A—A. The substantially U-shaped axle $t$ carries at the ends of its arms the stub-shafts $u$ on which the wheels R' are journaled, the bight-portion of the U-shaped axle extending across the frame $a$ on the opposite side of the fulcrum bearings $s$. An unguided coil spring, as $v$, may be mounted between a suitable portion of the supporting piece, as at $w$, and the center of the bight-portion of the axle $t$ to cushion the axle and normally press the wheels toward the ground. Such unguided coil spring $v$ would, as best shown in Fig. 2, also be positioned in the central longitudinal plane of the vehicle and so substantially in line with the longitudinal axis of the supporting piece.

As shown in Fig. 3 the axle $t$ is inclined rearwardly and downwardly from its bearings $s$ to the stub-shafts $u$, whereby both vertical and rearwardly directed shocks of the road are taken up yieldingly by the wheels.

As the entire driving aggregate is connected to the frame, swinging around its longitudinal axis, free torsional forces of the motor cannot be transferred undamped onto the frame. As shown in Fig. 3 the axis $x$ of the motor crank shaft extends somewhat inclined to the swinging axis B—B. The rear wheel drive ensues for example through a worm gear $y$ thence through the transverse shafts $z$ arranged across the frame and through the tubular extensions $p$ of the casing block and the bearings $s$ for the axle $t$. From the ends of the shafts $z$ the wheels journaled on the stub-shafts $u$ may be driven by means of a chain drive mechanism 10 or the like.

Having now particularly described and ascertained the nature of my invention and in what manner the same is to be performed, I declare that what I claim is:

1. In a vehicle having a frame, a rigid axle, a pair of ground-engaging wheels mounted on opposite ends of said axle, a member pivotally mounted on said frame for movement about the central longitudinal axis of the vehicle, means for pivotally mounting said rigid axle to said member for movement about a transverse axis, said member comprising a driving unit including an engine and driving gear supported on said member, and means for driving said wheels from said driving unit.

2. In a motor car, a pair of opposite road wheels, a vehicle frame, a supporting piece, means for joining the supporting piece to the vehicle frame in such a manner that it may swing with respect to it around a longitudinal axis of the vehicle, bearing pins on the supporting piece having a common axis extending substantially transverse to the longitudinal axis of the vehicle, a rigid axle connecting the pair of wheels to each other, means for journaling the rigid axle to the bearing pins, means for journaling the wheels on the rigid axle, so that the turning axis of the wheels is displaced relative to the axis of the said bearing pins in the longitudinal direction of the vehicle, whereby the wheels together with the rigid axle may execute a swinging motion around the axis of the bearing pins, an axle gear mounted on the supporting piece, a transverse shaft driven by the axle gear extending through the bearing pins, and means for transmitting the drive from the transverse shaft onto the wheels.

3. In a vehicle having a frame, a rigid axle, a pair of ground-engaging wheels mounted on opposite ends of said axle, a member pivotally mounted on said frame for movement about the central longitudinal axis of the vehicle, means for pivotally mounting said rigid axle to said member for movement about a transverse axis, yieldable means intermediate said rigid axle and said member, and further yieldable means intermediate said member and said frame, both of said yieldable means being adapted to resist the relative movement between the respectively movable parts.

4. The combination according to claim 3, in which each of said yieldable means are helical springs.

5. In a vehicle having a frame, a rigid axle, a pair of ground-engaging wheels mounted on opposite ends of said axle, a member pivotally mounted on said frame for movement about the central longitudinal axis of the vehicle, means for pivotally mounting said rigid axle to said member for movement about a transverse axis, a spring positioned substantially in the central longitudinal plane of the vehicle, intermediate said rigid axle and said member, and two springs positioned on either side of the central longitudinal plane, intermediate said member and said frame.

6. In a vehicle having a frame, a rigid, substantially U-shaped axle, a pair of ground-engaging wheels, one mounted on each arm of said U-shaped axle, a member pivotally mounted on said frame for movement about the central longitudinal axis of said vehicle, means for pivotally mounting said rigid axle to said member for movement about a transverse axis longitudinally displaced from the axis of said ground-engaging wheels, yieldable means intermediate the base of said U-shaped axle and said member, and other yieldable means intermediate said member and said frame, both of said yieldable means being adapted to resist the relative movement between the respectively movable parts.

7. The combination according to claim 1, in which said member is provided with pin-shaped transverse arms serving as the pivotal mounting of the axle on said member, and in which the means for driving the wheels from the driving unit includes driving shafts connected to the driving unit and extending outwardly through said transverse arms, and means connecting said driving shafts to said wheels.

8. The combination according to claim 1, in which said member is formed in the shape of a cross having pins with axes perpendicular to one another at the ends of the cross, two of said pins extending longitudinally of the vehicle and serving to pivotally support said member on said frame, and the other two pins extending transversely of said vehicle and serving to pivotally support said axle on said member.

9. In a motor car, a pair of wheels, a vehicle frame, an axle member for the pair of wheels, a cross shaped supporting piece, one cross axis of which extends in a longitudinal direction, and the other cross axis of which extends in the transverse direction of the vehicle, pins lying in the longitudinal direction at those ends of the cross shaped supporting piece which are directed in longitudinal direction pivotally connecting the supporting piece with the vehicle frame about a longitudinal axis, and other pins lying in transverse direction at the transversely directed ends of the cross shaped supporting piece, swingably connecting the axle member with the supporting piece about a transverse axis.

10. In a vehicle having a frame, a rigid, substantially U-shaped axle, a pair of ground-engaging wheels, one rotatably mounted on each arm of said U-shaped axle, an intermediate member having four arms in the shape of a cross, two of said arms extending in the longitudinal direction of the vehicle and two in the transverse direction of the vehicle, means for pivotally mounting the longitudinal arms on said frame, whereby said member may swing about a longitudinal axis relatively to the frame, and bearing means on said transverse arms for pivotally connecting said axle at a distance from its bight portion upon the transverse arms, whereby said axle may swing about a transverse axis relatively to said intermediate member.

11. The combination according to claim 10, in combination with driving gear supported on said member, and means for driving said wheels from said driving gear.

12. The combination according to claim 10, in which the axes of the wheels are longitudinally displaced from said transverse axis.

13. The combination according to claim 10, in which said U-shaped axle normally lies in a transverse plane extending rearwardly downwardly at an angle to said longitudinal axis.

14. The combination according to claim 1, in which the longitudinal axis of said driving unit lies in the same vertical plane but at an angle to the central longitudinal axis of the vehicle.

15. In a motor car, a pair of opposite road wheels, a vehicle frame, a supporting piece, means for joining the supporting piece to the vehicle frame in such a manner that it may swing around a longitudinal axis of the vehicle, bearing pins on the supporting piece having a common axis extending substantially transverse to the longitudinal axis of the vehicle, a substantially U-shaped rigid axle connecting the pair of wheels to each other and pivoted intermediate the ends of the arms of the U on said bearing pins, and means for journaling the wheels adjacent the extremities of the arms of the U so that the turning axis of the wheels is displaced relatively to the axis of said bearing pins longitudinally of the vehicle, whereby the wheels, together with the rigid axle, may execute a swinging motion around the axis of the bearing pins.

16. In a motor car the combination according to claim 15, wherein cushioning means is interposed between the bight portion of the U-shaped axle and the vehicle frame on the opposite side of said bearing pins from said wheels.

BÉLA BARÉNYI.